Patented Sept. 26, 1922.

1,430,523

UNITED STATES PATENT OFFICE.

GEORGES JENNY AND OSCAR JAECK, OF BASEL, SWITZERLAND, ASSIGNORS TO SWISS FERMENT COMPANY, LTD., OF BASEL, SWITZERLAND.

DEGUMMING TEXTILE MATERIALS.

No Drawing.      Application filed June 16, 1920. Serial No. 389,453.

*To all whom it may concern:*

Be it known that we, GEORGES JENNY and OSCAR JAECK, both citizens of the Swiss Republic, and residents of Basel, Switzerland, have invented new and useful Improvements in Degumming Textile Materials, of which the following is a full, clear, and exact specification.

The action which the amylase of malt has in rendering soluble starch and the like has been extensively applied for some years in textile industries for degumming unbleached or printed fabrics. This application using as it does large quantities of cereals which should be consumed as food has little to recommend it in ordinary times and becomes inadmissible in times of food shortage and the desirability of finding a suitable substitute becomes a matter of urgency.

Roberts (Proceedings of the Royal Society 1881, Vol. 32, page 145) has shown that the pancreas of certain animals secretes large quantities of an amylase, the diastatic power of which is proportionally far superior to that of amylases of vegetable origin; these glands being a waste material of the slaughter-house, their industrial application would be both an economical and a technical advance. However, the substitution of this amylase for vegetable amylases presents a number of difficulties in practice because the pancreatic amylase in very dilute solution, such as is required for degumming fabrics for example, is very much more sensitive than the vegetable amylases to the relatively high temperatures which are also necessary in the operation. In fact the dry starch which is present in the materials to be degummed, being practically incapable of attack by the ferments until it has been again gelatinized, makes it necessary that the operation should proceed at a temperature of about 60° C. Malt diastases used hitherto are able to withstand this temperature even in dilute solution and to act under these conditions with maximum energy, but this is not the case with pancreatic amylase which in dilute solution and at 55–60° C. rapidly loses its properties. This diluted aqueous extract of pancreas for example loses at 60° C. even in 5 minutes, at least three-quarters of its original activity. At 55° C. 10 minutes suffice to reduce by one-half the diastatic power, and even long exposure at 45–50° C. entails an appreciable diminution.

The present invention is based on the observation that the sensitiveness towards these high temperatures, which makes very uncertain rational use of pancreatic amylase for degumming, practically disappears if the degumming bath is made with addition of certain neutral salts (notably chlorides) as for instance neutral salts of alkali or alkaline earth metals. These salts have the property of protecting the amylase against the injurious action of heat. Suitable proportions of these neutral salts to be added to the bath are from 3–5 kilos or more per 1000 litres of the bath. It is preferable to use hard water in making up the bath, as the salts in this already exercise a certain protective action. Under these conditions the amylase subsequently added will preserve the whole of its activity, whereas without this addition of salts the ferement would be destroyed even before the textile material could be completely wetted. Most of the scientific work that has been done in connection with pancreatic amylase has been for the purpose of studying its action in the animal organism and has been conducted at the physiological temperature of 37.5–45° C., all temperatures above these being considered as prejudicial to the enzymatic activity. It is only owing to our investigations that we have been able to displace the optimum towards the temperature of 58–60 C. necessary for the industrial operation of degumming, while at the same time increasing the activity of the amylase and using it completely. Moreover, some of the neutral salts aforesaid, particularly chlorides, have even in very small proportion an activating action on the amylase, and owing to this fact the selection of suitable salts to be added is not merely a precaution against the destructive action of the heat but plays a considerable part in accelerating the disintegration of the starch.

The invention also relates to the avoidance of another practical difficulty common to all enzymatic processes of degumming, whether the amylase be of vegetable or animal origin; on the one hand it is hardly possible to exceed a temperature of 60° C. necessary for complete dissolution of the starch for physiological reasons; on the other hand the materials to be degummed are nearly always, owing to their nature, or to their previous treatment, more or less difficult to soak because they contain fatty or resinous matters, and in order to degum perfectly and rapidly it is obvious that the bath should penetrate as uniformly and as quickly as possible into the woven goods. The addition of materials which are commonly used to facilitate de-greasing, such as soda, soap and the like, cannot be made when amylase is being used because they give rise to rapid destruction of the ferment.

By the present invention biliary salts, the emulsifying action of which is well-known, are used together with pancreatic amylase. With this addition fabrics become rapidly soaked even at 60° C., the fatty matters and the spots of mineral oil are emulsified, while the addition is not hurtful to the action of the enzymes and even considerably improves that action. Finally, biliary salts have themselves a protective action upon animal amylase against the effect of high temperatures and in consequence this association with the neutral salts aforesaid confers upon the degumming bath a resistance which fulfils advantageously all practical requirements.

The following example illustrates the invention.

The degumming bath is prepared with ordinary hard water at 60° C. and there are added from 3-5 kilos of a neutral salt of an alkali or an alkaline earth metal, for instance sodium chloride or calcium chloride, per 1000 litres of the bath. On the other hand, there are dissolved or mixed in 10-20 parts of tepid or cold ordinary water, a suitable quantity of the preparation of pancreatic amylase and of biliary salts or of a mixture of these. This solution, filtered if necessary, is added to the degumming bath prepared as described above and the woven goods to be degummed are introduced, care being taken to keep the temperature of the bath constant, that is to say avoiding any fall of temperature to below 58° C. or thereabouts. The amylolytic action of this bath is at least 10 times that of a bath containing solely the same quantity of the diastatic product. The quantities and temperatures indicated in this example may be varied according to the nature of the goods to be degummed and the apparatus used.

What we claim is:
1. An improved biochemical process for degumming textile materials, consisting in first preparing an aqueous degumming bath containing pancreatic amylase, biliary salts and a neutral salt and treating the textile materials to be degummed with the said bath at a temperature of 58 to 60° C.

2. An improved biochemical process for degumming textile materials, consisting in first preparing an aqueous degumming bath containing pancreatic amylase, biliary salts and a neutral chloride and treating the textile materials to be degummed with the said bath at a temperature of 58 to 60° C.

3. An improved biochemical process for degumming textile materials, consisting in first preparing an aqueous degumming bath containing pancreatic amylase, biliary salts and a neutral alkali salt and treating the textile materials to be degummed with the said bath at a temperature of 58 to 60° C.

4. An improved biochemical process for degumming textile materials, consisting in first preparing an aqueous degumming bath containing pancreatic amylase, biliary salts and a neutral salt of an alkaline earth metal and treating the textile materials to be degummed with the said bath at a temperature of 58 to 60° C.

5. An improved biochemical process for degumming textile materials, consisting in first preparing an aqueous degumming bath containing pancreatic amylase, biliary salts and a neutral alkali chloride and treating the textile materials to be degummed with the said bath at a temperature of 58 to 60° C.

6. An improved biochemical process for degumming textile materials, consisting in first preparing an aqueous degumming bath containing pancreatic amylase, biliary salts and a neutral chloride of an alkali earth metal and treating the textile materials to be degummed with the said bath at a temperature of 58 to 60° C.

In witness whereof we have hereunto signed our names this 29th day of May 1920, in the presence of two subscribing witnesses.

GEORGES JENNY.
OSCAR JAECK.

Witnesses:
AMAND BRAUN,
JOHN H. LORD.